US007574674B2

(12) United States Patent
Schwartz et al.

(10) Patent No.: US 7,574,674 B2
(45) Date of Patent: Aug. 11, 2009

(54) METHOD FOR CONTROLLING FILENAME DISPLAY FOR IMAGE AND VIDEO FILE TYPES

(75) Inventors: Jordan L. K. Schwartz, Seattle, WA (US); Scott Dart, Lynnwood, WA (US); Linda I. Hong, Bellevue, WA (US); Christopher A. Evans, Sammamish, WA (US); Jingyang Xu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 619 days.

(21) Appl. No.: 10/817,040

(22) Filed: Apr. 2, 2004

(65) Prior Publication Data

US 2005/0223329 A1 Oct. 6, 2005

(51) Int. Cl.
*G06F 3/048* (2006.01)

(52) U.S. Cl. ....................... 715/838; 715/862; 715/711; 715/860; 711/113

(58) Field of Classification Search ................. 345/838; 715/711, 838, 828, 823, 860, 862; 711/113
See application file for complete search history.

(56) References Cited

U.S. PATENT DOCUMENTS 5,721,853 A * 2/1998 Smith ......................... 715/803
5,835,088 A * 11/1998 Jaaskelainen, Jr. .......... 715/803
6,496,206 B1 * 12/2002 Mernyk et al. .............. 715/835
6,622,168 B1 * 9/2003 Datta ......................... 709/219
6,750,890 B1 * 6/2004 Sugimoto ................... 715/838
6,915,489 B2 * 7/2005 Gargi ......................... 715/790
6,938,215 B2 * 8/2005 Kobayashi et al. .......... 715/810
7,003,736 B2 * 2/2006 Kanevsky et al. ........... 715/837
2002/0184496 A1 12/2002 Mitchell et al.
2004/0210767 A1 10/2004 Sinclair et al.
2005/0081043 A1 4/2005 Evans et al.
2005/0198319 A1 9/2005 Chan et al.

* cited by examiner

*Primary Examiner*—Weilun Lo
*Assistant Examiner*—Phenuel S Salomon
(74) *Attorney, Agent, or Firm*—Senniger Powers LLP

(57) ABSTRACT

A method, system and medium suitable for rendering substantially instantaneously thumbnail data pre-cached in a volatile memory. The thumbnail data is rendered once an indicator or pointer is hovered over an icon that has associated thumbnail data stored in the volatile memory.

9 Claims, 5 Drawing Sheets

METHOD FOR CONTROLLING FILENAME DISPLAY FOR IMAGE AND VIDEO FILE TYPES

FIELD OF THE INVENTION

The present invention generally relates to graphical user interfaces (GUIs) such as those used with general-purpose computers and other types of computing devices. More specifically, the present invention generally relates to GUIs that display windows and/or folders containing computer-generated icons.

BACKGROUND OF THE INVENTION

In the computer industry, use of GUIs is well known for enabling a user to select a particular file of data (such as a word-processing file or a graphics file), from a large available selection. A GUI is a type of display format that enables a user to operate a computer by pointing to pictorial representations, such as windows and icons, displayed on a screen device. A window usually has the shape of a rectangle displayed on a screen. Regardless of shape, a window affords a user workspace within a program and/or operating system. Generally, a user may move the window displayed on the screen, change its size and shape, enlarge it to fill the entire screen, close it entirely, or change how much of the contents of a window are displayed.

To navigate within a GUI, such as to select a particular file to be opened, most operating systems employ a screen cursor or pointer, typically displayed as a small arrow, that allows a user to select individual points on the screen. In operation, the cursor may be moved to a desired location in response to movements of a pointing device (e.g., a mouse, trackball, or equivalent) by the user. In addition to affecting cursor movement, most pointing devices include one or more switches or buttons for specifying additional user input or user events. Because many user choices may be implemented through the use of a pointing device, the need for users to memorize special commands or keystrokes is lessened.

A standard GUI may provide access to a hierarchy of containers into which individual files can be organized. For example, a set of files may be placed in a folder, and a set of folders may be placed in another folder. This layered effect, which is associated with most general GUIs, provides for exceptional organizational features that may be utilized by a user.

When a folder is opened in the context of a GUI, there is typically displayed a rectangular space on the screen, and within the rectangular space is displayed a set of icons, each icon being associated with one file (such as a text or graphics file) in the folder. As previously mentioned, the rectangular space may be generally considered as a window in the context of GUIs. Once a window is opened, the contents of the window are typically displayed as icons that have specific relation to folders and/or file types. For example, word-processing documents are generally all assigned icons of identical basic appearance, such as a sheet of graphically displayed paper with a folded corner, or a stylized capital W embodied within the icon. The use of similar appearing icons for similar items allows users to quickly identify the type of file that is associated with an icon. Filenames are also displayed adjacent to icons in order to aid a user in identifying the type of file associated with the icon.

FIG. 1 illustrates a conventional GUI window. More specifically FIG. 1 illustrates a window 10 that contains a plurality of icons 20 in a partitioned window section 30. The window 10 also includes a supplemental window section 40 that includes menus 50 and 60. Furthermore, the window 10 also includes a standard bar area 70 and a title bar 80.

As is illustrated, the window section 30 includes various icons 20 of differing appearances, each with an associated filename. For example, the icons associated with "Relations-.doc," "Subcross.doc," and "Wffokcyw.doc" are related to word-processing files, and the icon with the associated filename "Accotink1.jpg" is related to an image file, as are the icons with the associated filenames "Accotink2.jpg" and "Roberta Sacchi.jpg." The icon associated with filename "Rejections.ppt" is related to a PowerPoint® file. The icon associated with the filename "Unrelated" is not related to particular application, as the filename "Unrelated" does not have an extension that may be used to connect the file to a certain application. The general descriptive nature of the indicated filenames, along with the icons, give a user of an operating system including such a conventional window 10 the ability to determine the general contents of a file before actually opening the file.

Generally, an icon and an icon filename are used to identify the data and the format of the data associated with both the icon and its related filename. In order to gain more detail about the data, the file must be opened so that the format and specifics of the data can be viewed.

In some cases, an icon may include thumbnail data (explained below), which can be viewed by a user. Even though this offers additional information to a user viewing the icon with the thumbnail data, the data is generally very difficult to see, and if the icon size is reduced to a very small size, the thumbnail data may be impossible to discern. In window section 30, the icons associated with filenames "Accotink1.jpg," "Accotink2.jpg," and "Roberta Sacchi.jpg" each have thumbnail data.

SUMMARY OF THE INVENTION

An exemplary embodiment of the present invention provides a method that senses the presence of an indicator in a vicinity of an icon having associated thumbnail data, and that can render a view of at least a portion of the thumbnail data, the view rendered in the vicinity of the icon.

Another exemplary embodiment of the present invention provides a method that includes pre-caching thumbnail data associated with at least one icon displayed in a viewable interface, and displaying the pre-cached thumbnail data associated with the at least one icon when an indicator is hovered substantially over the at least one icon.

Yet another exemplary embodiment of the present invention provides a system having an arrangement for pre-caching thumbnail data associated with at least one icon, the arrangement further for displaying the pre-cached thumbnail data associated with the at least one icon when an indicator is hovered substantially over the at least one icon.

Another exemplary embodiment of the present invention provides a computer-readable medium having code segments embodied thereon that cause a machine to perform sensing the presence of an indicator in a vicinity of an icon having associated thumbnail data, and rendering a view of at least a portion of the thumbnail data, the view rendered in the vicinity of the icon.

Another exemplary embodiment of the present invention provides a computer-readable medium having code segments embodied thereon that cause a machine to perform pre-caching thumbnail data associated with at least one icon displayed in a viewable interface, and displaying the pre-cached thumbnail data associated with the at least one icon when an indicator is hovered substantially over the at least one icon.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE EXEMPLARY EMBODIMENTS

In order to ensure clarity in the description related to exemplary embodiments according to the present invention, the following terms are defined:

A "thumbnail" is a quantity of data that is derived from a larger quantity of data, such as a file. A thumbnail can be obtained by opening one image page from a file and optically reducing or scaling the image to a smaller size. Alternatively, discrete portions of data from a file can be pulled from the file, such as keywords, a pre-written or artificially derived summary of the data, a title, a list of column headings, any text strings that are formatted to be of larger than usual type size, which would be consistent with headlines, etc. This data may be integrated with an icon to provide a user visual representation of the contents of a folder or file without having to actually open the folder or file.

A "folder" is a term which can be applied to any organizational structure that can hold one file, a plurality of files, and/or a folder or multiple folders.

An "icon" is a basic bitmap of a predetermined design, which a user can identify as relating to a file, or at least a file of a certain type. In accordance with the description of the exemplary embodiments according to the present invention, an icon may or may not include associated thumbnail data.

Figure 1:
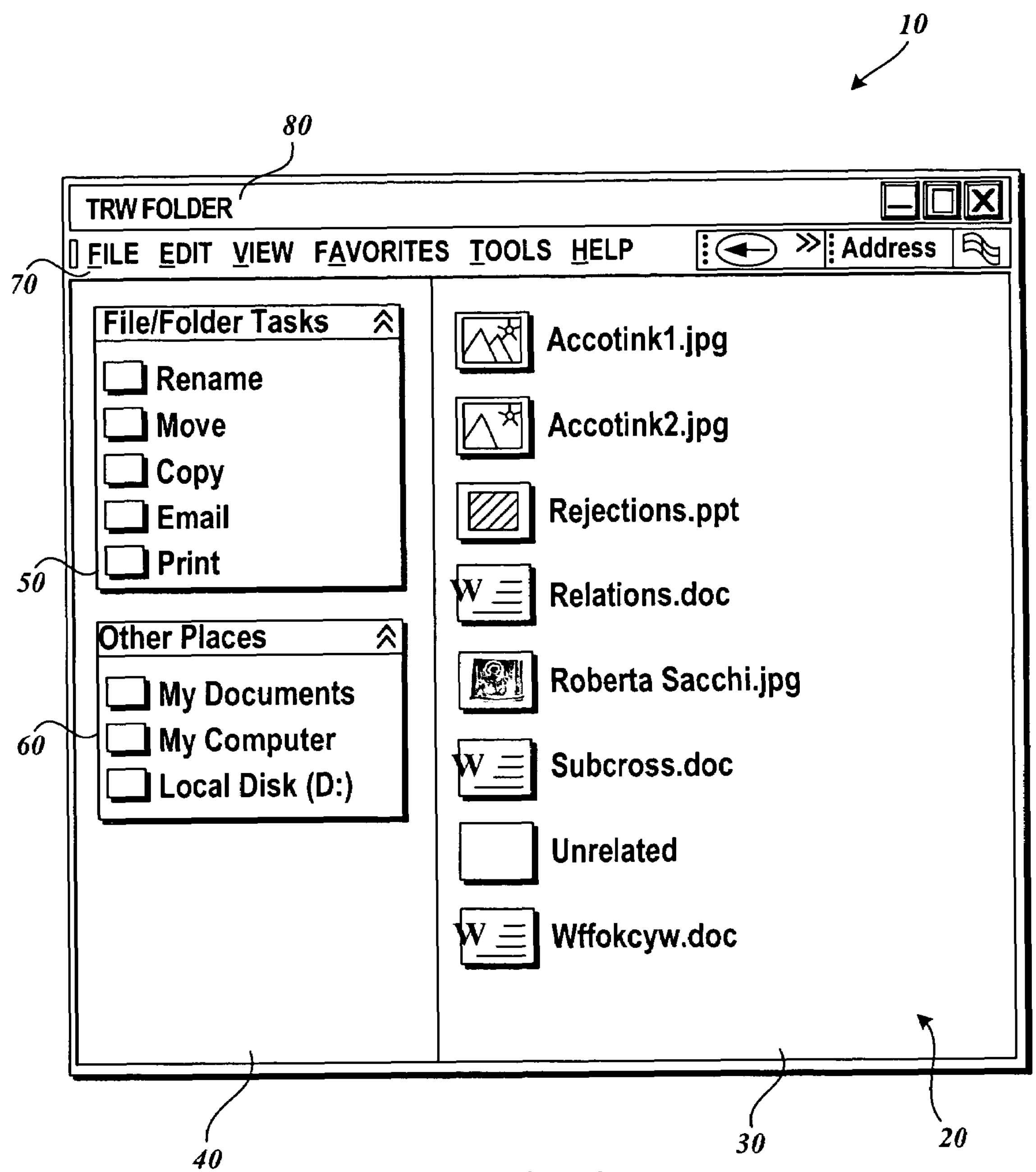
FIG. 1 illustrates a conventional window view displayable in a GUI.
Figure 2:
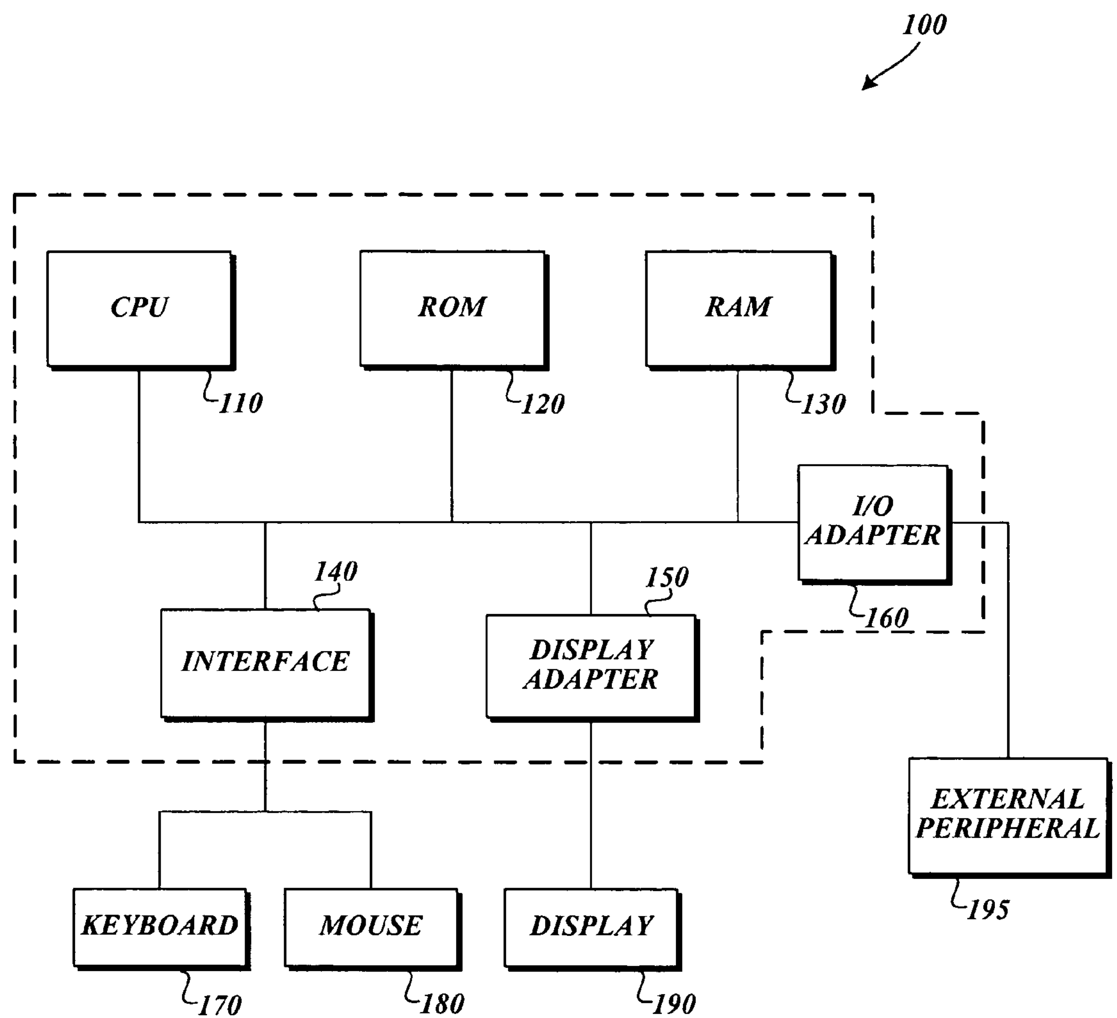
FIG. 2 illustrates a block diagram of a system suitable for providing an exemplary operating environment for an exemplary embodiment of the present invention.

FIG. 2 illustrates a block diagram of a system 100 suitable for providing an exemplary operating environment for an exemplary embodiment of the present invention. The system 100 illustrated in FIG. 2 for operating an exemplary embodiment of the present invention includes a central processing unit (CPU) 110, a read-only memory (ROM) 120, and a random access memory (RAM) 130. In addition, the system 100 includes an interface 140, a display adapter 150, and an I/O adapter 160. The foregoing elements are illustrated as being generally connected and associated as one cohesive unit. However, this is done by way of illustration only. The illustrated elements may be fashioned in a variety of manners well known to those skilled in the art.

The system 100 may also includes various external devices. Illustrated external devices include a keyboard 170, a mouse 180, a display 190, and an external peripheral 195. The external peripheral 195 may be, for example, a printer, a storage device, etc.

This description of the exemplary embodiments according to the present invention may refer to the system 100 as a computer system. However, it should be understood that the system 100 may be implemented in various operational devices. For example, the system 100, or a similar system, may be implemented in a personal digital assistant (PDA), a mobile telephone, a handheld computer, an information kiosk, etc. Therefore, it should be clear that the system 100 illustrated in FIG. 2 should be construed as exemplary and not limiting of embodiments of the present invention. Thus, the system 100 should be considered as illustrative of the environment in which exemplary embodiments described herein may be used.

Figure 3:
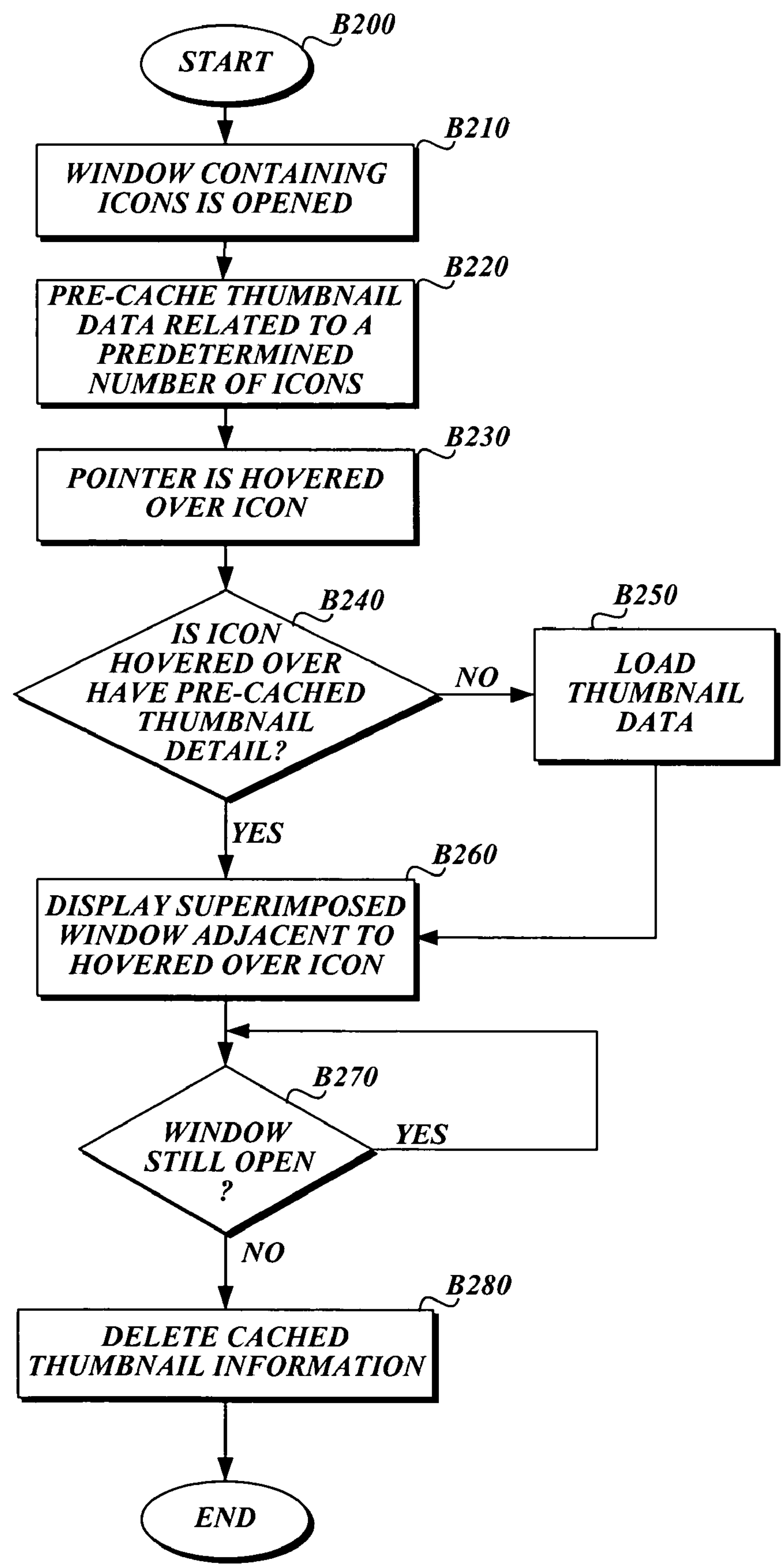
FIG. 3 is a flowchart illustrating a process for displaying a superimposed window according to an exemplary embodiment of the present invention.
Figure 4:
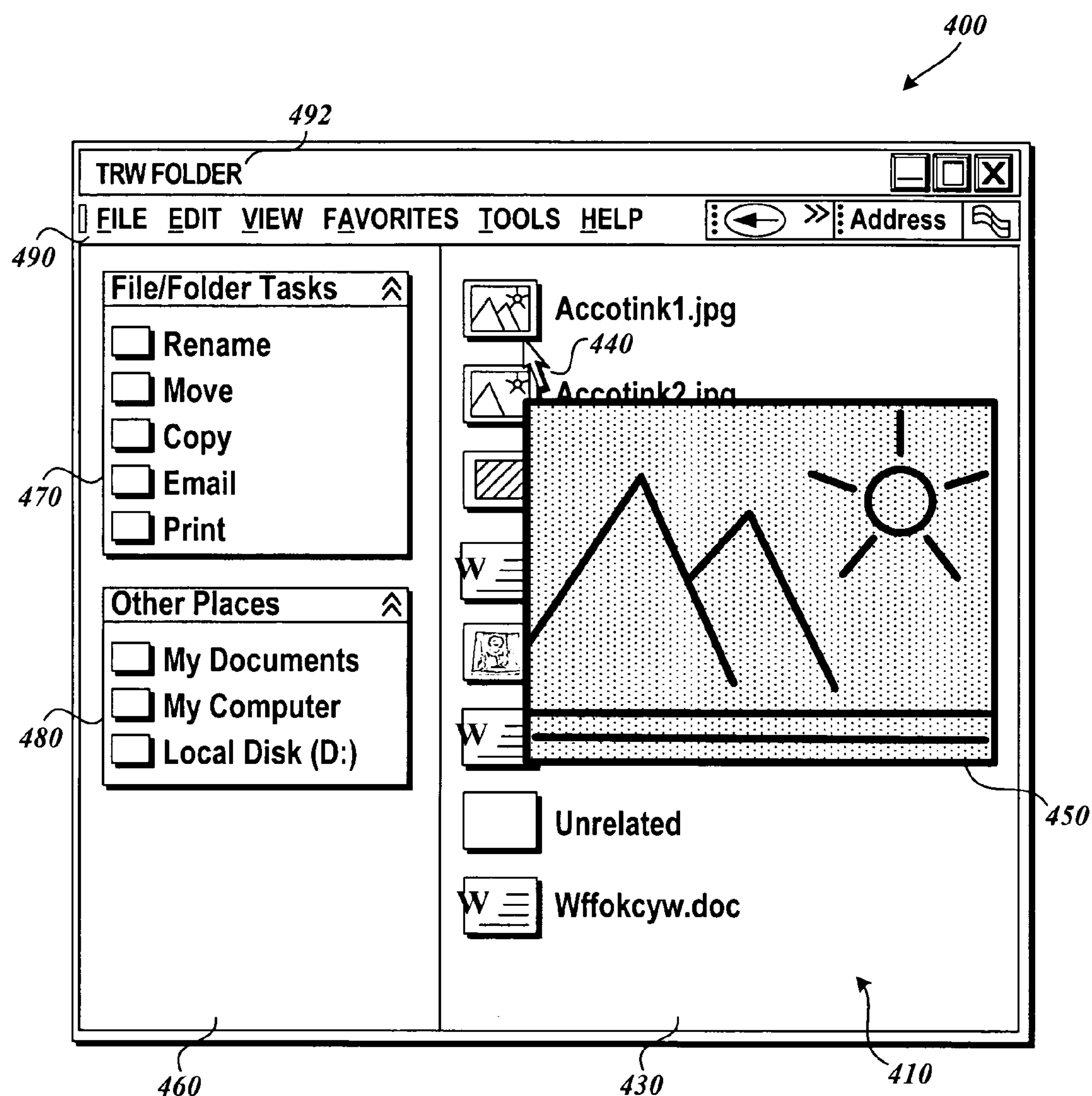
FIG. 4 illustrates a window including a superimposed window according to an exemplary embodiment of the present invention.

FIG. 3 is a flow chart illustrating a process for displaying a superimposed window according to an exemplary embodiment of the present invention. FIG. 4 illustrates a window 400 including a superimposed window 450 according to an exemplary embodiment of the present invention. FIG. 4 will be discussed in conjunction with the flow chart illustrated in FIG. 3. FIG. 2 will also be referenced in the following description of the exemplary embodiments of the present invention.

Block B200 illustrated in FIG. 3 represents the beginning of a process according to an exemplary embodiment of the present invention. By way of a system, such as the computer system 100, a user may open the window 400 that includes various icons 410 (B210). Then, any thumbnail data associated with a predetermined number of icons is pre-cached into the RAM 130. The thumbnail data may be retrieved from a storage device, such as the external peripheral 195. The thumbnail data may also be retrieved from a storage device (not shown) internally integrated in the computer system 100.

According to an exemplary embodiment of the present invention, the amount of thumbnail data retrieved and stored in the RAM 130 may be modified in the interest of saving system resources. For example, defined system constraints may limit the amount of thumbnail data retrieved and stored in the RAM 130 to a predetermined number of icons that include thumbnail data. For example, the computer system 100 may limit the thumbnail data loaded into the RAM 130 to those icons that are currently displayed in a partitioned window section 430. Therefore, in the case of the icons 410 displayed in the partitioned window section 430, the thumbnail data associated with the filename "Accotink1.jpg," "Accotink2.jpg," and "Roberta Sacchi.jpg" would be loaded into the RAM 130. Furthermore, the thumbnail data related to filename "Rejections.ppt" would also be loaded into the RAM 130.

Alternatively, the computer system 100 may also limit the amount of thumbnail data loaded into the RAM 130 to a predetermined number of icons that include thumbnail data, based on an icon that includes thumbnail data that is first hovered over using a cursor 440. For example, if the computer system 100 is set to limit the number of icons that include thumbnail data to two (2) in the vicinity of an icon hovered over by the pointer 440, then the thumbnail data associated with "Accotink2.jpg" and "Rejections.ppt" would be loaded into the RAM 130. The thumbnail data associated with the icon connected to "Roberta Sacchi.jpg" would therefore, in this case, not be loaded into the RAM 130.

The two examples discussed are used by way of illustration only. Therefore, other constraints with respect to an amount of thumbnail data retrieved and saved may also be used in conjunction with the exemplary embodiments of the present invention.

With further reference to FIGS. 2, 3 and 4, after opening the window 400 that includes the icons 410, the pointer 440 may be moved by the mouse 180 so that the pointer 440 is hovering over the icon associated with the filename "Accotink1.jpg" (B230). At the instant this occurs, the pre-cached thumbnail data in the RAM 130 is retrieved and a superimposed window 450 is displayed within the partitioned window section 430. In the case of the icon associated with the filename "Accotink1.jpg," the thumbnail data displayed in the superimposed window 450 is merely a larger representation of the thumbnail data displayed in conjunction with the icon. Therefore, regardless of the size of the icon, it is easy to discern the thumbnail data associated with the icon the pointer 440 is hovered over.

The process of displaying the superimposed window 450 requires determining if the thumbnail data associated with the icon the pointer 440 is hovered over is pre-cached in the RAM 130 (B240). If the icon hovered over using the pointer 440 does not include its thumbnail data pre-cached in the RAM 130, then a storage device, such as the external peripheral 195 in the case that it is a storage device, is accessed to retrieve the associated thumbnail data (B250). Once the thumbnail data is retrieved, then the superimposed window 450 may be displayed as discussed above. However, if the thumbnail data is pre-cached in the RAM 130, then the loading function is not required and the superimposed window 450 is displayed immediately in the partitioned window section 430 (B260). The particular advantage of pre-caching thumbnail data is that there is essentially no delay in rendering the superimposed window 450. In particular, the use of pre-cached data in the RAM 130 may be accessed in a faster manner than data stored on non-volatile memory, such as a storage device associated with the external peripheral 195.

The thumbnail data associated with the icons 410 in the partitioned window section 430 will remain in the RAM 130 until the window 400 is closed by a user (B270). Once the window 400 is closed, the thumbnail data stored in the RAM 130 will be deleted (B280). If an additional window is opened by a user, then the process illustrated in FIG. 3 will be repeated.

As illustrated in FIG. 4, the window 400 may also include a supplemental window section 460 that includes menus 470 and 480. Furthermore, the window 400 also includes a standard bar area 490 and a title bar 492.

Figure 5:
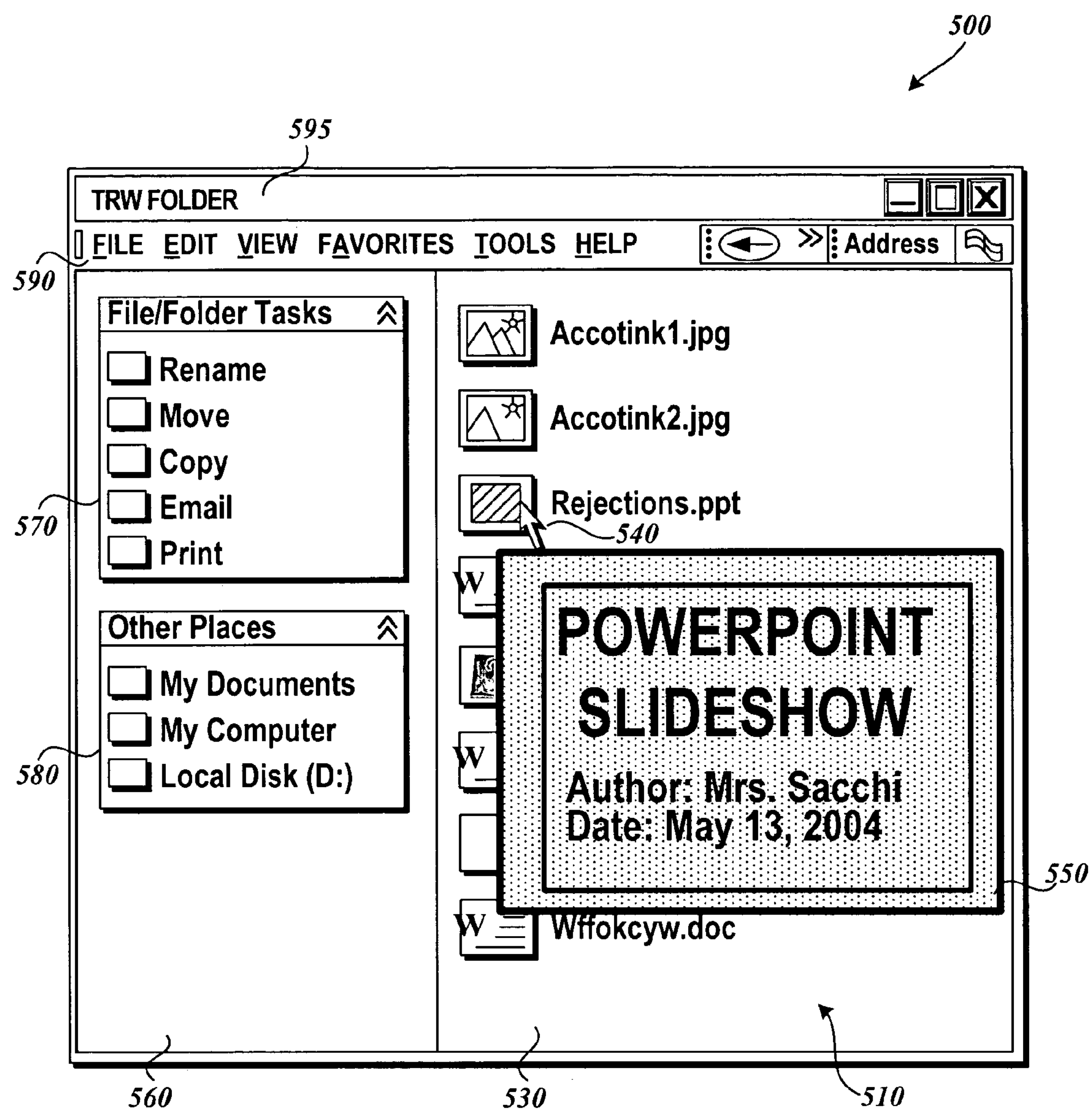
FIG. 5 illustrates a window including a superimposed window according to another exemplary embodiment of the present invention.

FIG. 5 illustrates a window 500 including a superimposed window 550 according to another exemplary embodiment of the present invention. The window 500 may be rendered, in part, using the functionality discussed in relation to the process illustrated in FIG. 3. The operational characteristics of the process illustrated in FIG. 3 will not be repeated in view of brevity considerations.

As illustrated in FIG. 5, the window 500 also includes a partitioned window section 530 with various icons 510 rendered therein. The window 500 also includes a supplemental window section 560 with menus 570 and 580. Furthermore, the window 500 also has a standard bar area 590 and a title bar 595.

FIG. 5 illustrates the manner in which thumbnail data associated with the icon representing the filename "Rejections.ppt" is displayed in the superimposed window 550. In the case of the window 500 illustrated in FIG. 5, the filename "Rejections.ppt" is associated with Microsoft's PowerPoint® software. However, this is by way of illustration only. That is, thumbnail data may also be associated with icons representing word processing file types, movie file types, other multimedia file types, etc.

A user may move a pointer 540 such that it hovers over the icon associated with the filename "Rejections.ppt." Once this occurs, the RAM 130 is accessed to determine if thumbnail data is stored therein in conjunction with the icon the pointer 540 is hovered over. If so, the superimposed window 550 is immediately displayed in the partitioned window section 530. In the case of the PowerPoint® file "Rejections.ppt," the first slide of the file "Rejections.ppt" is used as the thumbnail data. However, it is also possible to associate the thumbnail data with other portions of the data associated with the file "Rejections.ppt." As indicated, other file types associated with other types of applications may also include thumbnail data, although such files are not illustrated in the drawings.

Although the exemplary embodiments of the present invention have been discussed in conjunction with icons that include thumbnail data, the present invention may be used with other elements that include thumbnail data. For example, a superimposed window may be displayed when a pointer is hovered over an element having the dimensions $\beta \times \alpha$, where both $\beta$ and $\alpha$ are expressed in pixels. Therefore, a 64×64 pixel thumbnail may be displayed as a superimposed window of 246×256 when a pointer is hovered over the 64×64 pixel thumbnail.

As those of skill in the art recognize, the exemplary embodiments of the present invention may be embodied and/or implemented in both hardware and software, or a combination of both. For example, the exemplary embodiments of the present invention may be programmed using a programming language and stored on a storage medium for use by a system having processing capability. Furthermore, the exemplary embodiments of the present invention may be implemented in hardware, such as a semiconductor device or the like, that may be integrated into a system designed to access and make use of the hardware.

While the exemplary embodiments of the invention have been illustrated and described, it will be appreciated that various changes can be made therein without departing from the spirit and scope of the present invention.

The embodiments of the invention in which an exclusive property or privilege is claimed are defined as follows:

1. A method comprising:

sensing the presence of an indicator in a vicinity of an icon having associated thumbnail data representative of content of an associated object, wherein said icon and a plurality of additional icons are located within a viewable interface, each of the additional icons having associated thumbnail data representative of content of an associated object;

rendering a superimposed view of at least a portion of the thumbnail data, the superimposed view rendered in the vicinity of the icon;

in response to said sensing, identifying a predetermined number of the plurality of additional icons based on the locations within the window of the plurality of additional icons relative to said icon, wherein the predetermined number of icons is greater than one icon and less than the total number of the plurality of additional icons located within the viewable interface; and in response to said identifying, pre-caching thumbnail data only for the identified additional icons.

2. The method according to claim 1, wherein pre-caching the thumbnail data includes storing the thumbnail data in volatile memory.

3. The method according to claim 1, wherein the viewable interface is a window and the superimposed view rendered is rendered within the window.

4. A method for displaying thumbnail data associated with at least one of a plurality of icons located in a window, each of said plurality of icons having thumbnail data associated therewith, said method comprising:

sensing the presence of an indicator in a vicinity of an icon having associated thumbnail data representative of content of an associated object, wherein said icon and a plurality of additional icons are located within a viewable interface, each of the additional icons having associated thumbnail data representative of content of an associated object;

rendering a superimposed view of at least a portion of the thumbnail data, the superimposed view rendered in the vicinity of the icon;

identifying a predetermined maximum number of icons for which thumbnail data will be pre-cached, said predetermined maximum number being independent of the total number of icons located in the window;

comparing the total number of icons located in the window to the pre-determined maximum number of icons;

pre-caching the thumbnail data for a particular number of the plurality of icons located in the window based on said comparing, wherein said particular number is the pre-determined maximum number when said predetermined maximum number is less than or equal to the total number, and wherein said particular number is the total number when the predetermined maximum number is greater than said total number, said thumbnail data representative of content of an associated object; and displaying the pre-cached thumbnail data associated with one of the plurality of icons when an indicator is hovered substantially over said icon.

5. The method according to claim 4, wherein the pre-cached thumbnail data is available for substantially instantaneous rendering at the moment the indicator is hovered substantially over one of the plurality of icons.

6. The method according to claim 5, wherein the thumbnail data is pre-cached in volatile memory.

7. A computer-readable storage medium having instructions stored thereon that direct a computing system to:

sense the presence of an indicator in a vicinity of an icon having associated thumbnail data representative of content of an associated object, wherein said icon and a plurality of additional icons are located within a viewable interface, each of the additional icons having associated thumbnail data representative of content of an associated object;

render a superimposed view of at least a portion of the thumbnail data, the superimposed view rendered in the vicinity of the icon;

in response to said sensing, identify a predetermined number of the plurality of additional icons based on the locations within the window of the plurality of additional icons relative to said icon, wherein the predetermined number of icons is greater than one icon and less than the total number of the plurality of additional icons located within the viewable interface; and in response to said identifying, pre-cache thumbnail data only for the identified additional icons.

8. A computer-readable storage medium having instructions stored thereon for displaying thumbnail data associated with at least one of a plurality of icons located in a window, each of said plurality of icons having thumbnail data associated therewith, said instructions directing a computing system to:

sensing the presence of an indicator in a vicinity of an icon having associated thumbnail data representative of content of an associated object, wherein said icon and a plurality of additional icons are located within a viewable interface, each of the additional icons having associated thumbnail data representative of content of an associated object;

rendering a superimposed view of at least a portion of the thumbnail data, the superimposed view rendered in the vicinity of the icon;

identify a predetermined maximum number of icons for which thumbnail data will be pre-cached, said predetermined maximum number being independent of the total number of icons located in the window;

compare the total number of icons located in the window to the pre-determined maximum number of icons;

pre-cache the thumbnail data for a particular number of the plurality of icons located in the window based on said comparing, wherein said particular number is the predetermined maximum number when said predetermined maximum number is less than or equal to than the total number, and wherein said particular number is the total number when the predetermined maximum number is greater than said total number, said thumbnail data representative of content of an associated object; and display the pre-cached thumbnail data associated with one of the plurality of icons when an indicator is hovered substantially over said icon.

9. The method of claim 1, wherein the icon for which the pre-cached thumbnail data is displayed and the displayed thumbnail data are different.

* * * * *

UNITED STATES PATENT AND TRADEMARK OFFICE

CERTIFICATE OF CORRECTION

PATENT NO. : 7,574,674 B2
APPLICATION NO. : 10/817040
DATED : August 11, 2009
INVENTOR(S) : Schwartz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 997 days.

Signed and Sealed this

Seventh Day of September, 2010

David J. Kappos

*Director of the United States Patent and Trademark Office*